United States Patent
Phillips

(12) 
(10) Patent No.: US 10,511,044 B2
(45) Date of Patent: Dec. 17, 2019

(54) ALKALINE HYBRID REDOX FLOW BATTERY WITH HIGH ENERGY DENSITY

(71) Applicant: Jeffrey Phillips, La Jolla, CA (US)

(72) Inventor: Jeffrey Phillips, La Jolla, CA (US)

(73) Assignee: Jeffrey Phillips, La Jolla, CA (US)

( * ) Notice: Subject to any disclaimer, the term of this patent is extended or adjusted under 35 U.S.C. 154(b) by 69 days.

(21) Appl. No.: 15/787,637

(22) Filed: Oct. 18, 2017

(65) Prior Publication Data

US 2019/0115609 A1 Apr. 18, 2019

(51) Int. Cl.
| | |
|---|---|
| *H01M 8/18* | (2006.01) |
| *H01M 4/52* | (2010.01) |
| *H01M 4/60* | (2006.01) |
| *H01M 8/0202* | (2016.01) |
| *H01M 8/2455* | (2016.01) |
| *H01M 8/0444* | (2016.01) |
| *H01M 8/04537* | (2016.01) |
| *H01M 4/36* | (2006.01) |

(52) U.S. Cl.
CPC .......... *H01M 8/188* (2013.01); *H01M 4/368* (2013.01); *H01M 4/52* (2013.01); *H01M 4/60* (2013.01); *H01M 8/0202* (2013.01); *H01M 8/04477* (2013.01); *H01M 8/04552* (2013.01); *H01M 8/04611* (2013.01); *H01M 8/2455* (2013.01); *H01M 2250/10* (2013.01); *H01M 2300/0014* (2013.01)

(58) Field of Classification Search
CPC ...... H01M 8/188; H01M 8/0202; H01M 4/60; H01M 4/52; H01M 4/368
See application file for complete search history.

(56) References Cited

U.S. PATENT DOCUMENTS

| | | | | |
|---|---|---|---|---|
| 2013/0084474 A1* | 4/2013 | Mills | .................. | H01M 4/9016 |
| | | | | 429/9 |
| 2013/0323611 A1* | 12/2013 | Wang | .................... | H01M 8/188 |
| | | | | 429/409 |

(Continued)

*Primary Examiner* — Stewart A Fraser

(57) ABSTRACT

A novel high cycle life, low cost hybrid redox flow battery that has application in the storage of energy generated by solar cells, windmills and other means is described. By combining a solid battery positive electrode with a redox flow negative electrode, the volumetric energy density of the system is maximized and footprint minimized for medium scaled installations of multi kilowatt-hour size as may be envisioned in domestic distributed power systems. The positive electrode is a high cycle life rechargeable nickel hydroxide electrode in alkaline solution. The negative active material is a low cost organic chemical such as a substituted anthroquinone dissolved in an alkaline electrolyte and stored external to the negative plate of the electrochemical device. The material of the negative plate is high surface area and capable of facilitating the oxidation and reduction reactions of the negative active material. The negative and positive electrodes are separated by an electronically insulating but ionically conducting separator material that allows ionic mobility and the generation of electric current when charging or discharging of the battery takes place. Ideally, an ion exchange membrane would separate the positive and negative active material in order to maximize service life and reduce intermingling of active material.

12 Claims, 3 Drawing Sheets

Schematic of Single Cell of Hybrid Redox Flow Battery

(56) References Cited

U.S. PATENT DOCUMENTS

| | | | |
|---|---|---|---|
| 2014/0255812 A1* | 9/2014 | Fischel | H01M 8/04291 |
| | | | 429/451 |
| 2016/0248114 A1* | 8/2016 | Huskinson | H01M 8/188 |
| 2018/0048011 A1* | 2/2018 | Aziz | H01M 8/188 |
| 2018/0097249 A1* | 4/2018 | Narayan | H01M 8/188 |

* cited by examiner

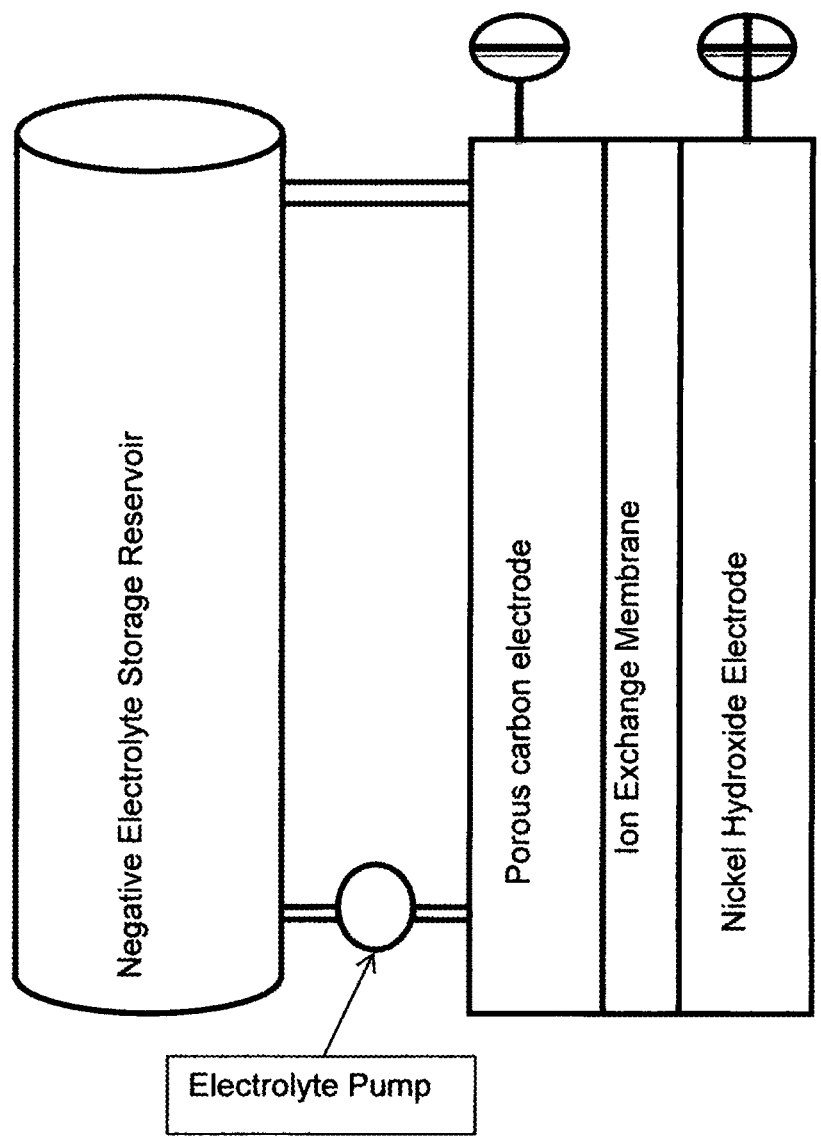
Fig. 1 Schematic of Single Cell of Hybrid Redox Flow Battery

Fig. 2 Nickel Oxide Open Circuit Voltage vs Zinc electrode
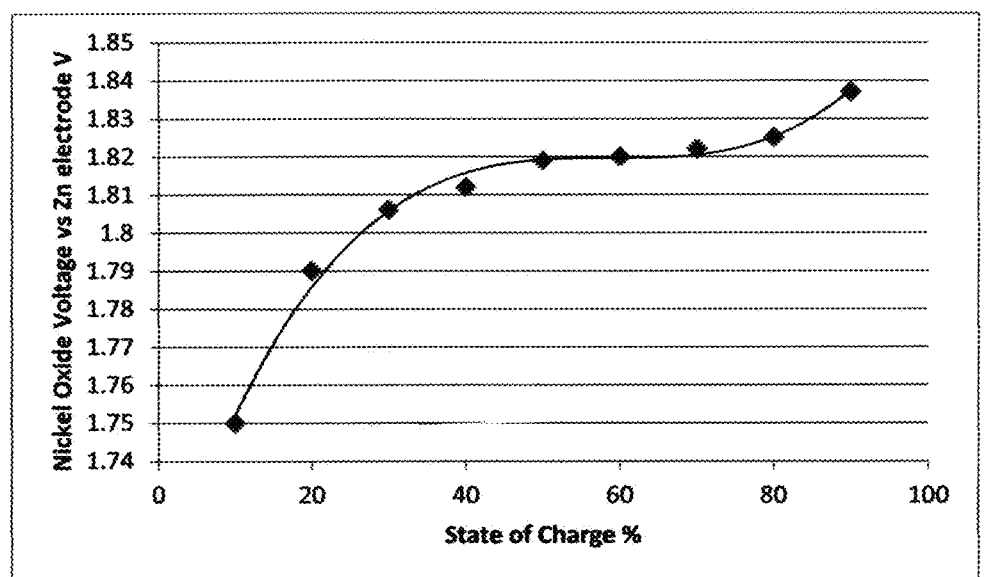

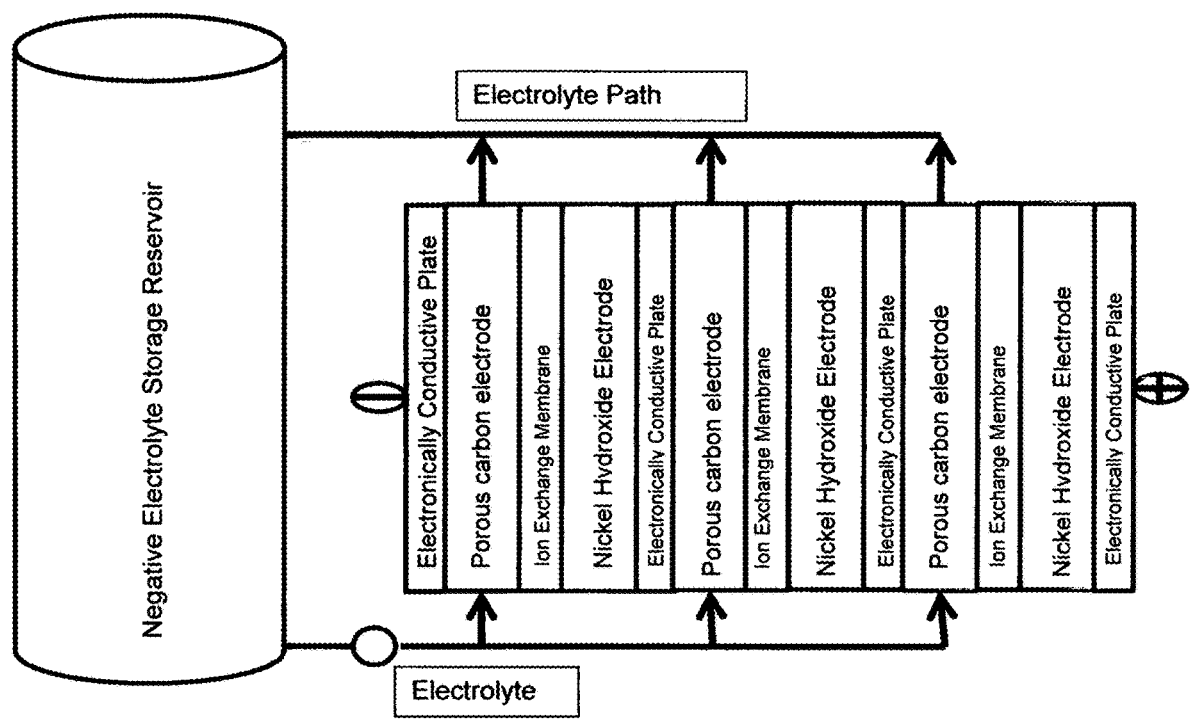
Fig. 3 Bipolar Stack Arrangement (3 cell Illustration)

ALKALINE HYBRID REDOX FLOW BATTERY WITH HIGH ENERGY DENSITY

FEDERALLY SUPPORTED RESEARCH

Not applicable

RELATED U.S. APPLICATION DATA

Provisional Application No. 415,402 titled "An Alkaline Hybrid Redox Flow Battery with High Energy Density" filed on Oct. 31, 2016

REFERENCES

U.S. Patent Documents

U.S. Pat. No. 9,614,245 B2 Narayan et al.
U.S. Pat. No. 9,293,777 B2 Wang et al.
US 2017/0237091 A1 Zhang et al.

Other Publications

Lin et al., Science Vol 349, no. 6255, pp 1529-1532 Sep. 25, 2015
Marvin S. Antelman, The Encyclopedia of Chemical Electrode Potentials, Plenum Press, New York 1982

BACKGROUND

The intermittent nature of energy supplied by photovoltaic and wind electricity generation has increased the need for energy storage that allows energy to be stored and retrieved on demand. Batteries provide a convenient mode of energy storage that can be located close to the site of generation. However, batteries can suffer disadvantages associated with their high cost, temperature sensitivity, and insufficient service or cycle life. In addition, as batteries are scaled up to meet the energy storage demands of medium scale applications of tens to hundreds of kilowatt hours there are concerns about the safety of these systems, particularly when the negative electrode incorporates lithium ion technology. Aqueous flow batteries have been developed as a possible solution to the large scale storage of energy. By using active material stored external to the electrode stack they have been proposed as a low cost and readily scalable solution to large scale energy storage. The physical separation of active materials in so called flow type batteries is also a significant factor in improving the safety of the systems for use in a home environment. However, some of these batteries have used toxic halogen materials while other systems have used expensive transition metals such as vanadium or chromium. In general, the costs and the system lifetimes have not met expectations. This is particularly true in kilo Watt hour scale systems that must maintain high performance, even as the increased size of the system dictates more complex electrochemical engineering solutions. In this specific application there is also a need for higher volumetric energy density than is normally associated with medium sized redox flow batteries. In efforts to control costs there has been a recent emphasis on organic redox couples in aqueous media that have the potential for high cycle life and low cost. However, the solubility limitations and relatively low voltages are significant drawbacks to the viability of the systems.

BRIEF DESCRIPTION OF DRAWINGS

FIG. 1 is a schematic illustration of a single cell alkaline electrolyte hybrid redox flow battery employing a nickel hydroxide positive electrode and negative electrode separated by an ion exchange membrane. The dissolved organic negative active material is stored external to the site of electron transfer.

FIG. 2 shows the nickel hydroxide electrode open circuit potential between 20% and 80% state of charge.

FIG. 3 is a schematic illustration of how single cells can be configured to produce a higher voltage battery.

DESCRIPTION OF INVENTION

The combination of a high energy density, high cycle life solid battery electrode with a redox flow system separated by an ion exchange membrane can address many of the shortcomings of currently proposed large scale energy storage systems. In particular, the combination of an alkaline nickel hydroxide positive electrode with a quinone based negative redox flow electrode can deliver voltages in excess of 1.2V and can reduce the footprint required within a home by incorporating only one redox flow component per battery or module. For medium sized systems, this can reduce the losses due to shunt currents and electrolyte pumping. In addition this hybrid redox flow battery has high power capability over a wide temperature range since the electrolyte is a highly conductive aqueous hydroxide solution with a wide operational temperature range.

The system may be configured to be limited by the positive nickel hydroxide electrode when maximum energy density and lowest cost is required. For maximum round trip energy efficiency the nickel electrode can operate between 80% and 0% state of charge. Under these conditions the coulombic inefficiency associated with oxygen evolution and fully charging the nickel electrode is avoided. A ready calibration of the end of charge point does not require a sophisticated battery management system since the tank containing the redox flow materials can be monitored using a simple electrochemical reference electrode system that can output voltage values to deliver an accurate and continual state of charge of the system. Alternatively, spectroscopic means could also be used to provide a digital output for charge and discharge control.

Examples

Single Cell Battery

A single cell can be set up as in FIG. 1. The cell is fabricated in two halves. Each half is made of polypropylene. The right hand side has a cavity that houses a pasted nickel hydroxide electrode that has been coined and tabbed with a nickel strip in the area uncoated with active material. The nickel tab is connected by spot welding to a stainless steel terminal sealed into the polypropylene with polypropylene hot melt. A hole is provided to enable filling of the half cell with electrolyte. At the other half of the cell, a nickel wire is connected to a carbon plate with silver filled epoxy and coated with epoxy and polypropylene glue. The carbon plate is sealed onto the back side of the cell with polypropylene hot melt. Multiple channels can be machined in the plate to increase surface area and allow for electrolyte flow. High surface area and easily wettable carbon electrodes can also be incorporated into the electrode system in order to reduce current densities. A cation exchange membrane is then placed between the two cell halves and sealed with polypropylene hot melt. A cation exchange membrane is preferred over an anion exchange membrane since there will be more effective inhibition of the transport of negatively charged organic molecules through the membrane.

This is an important consideration in extending the service life of the system since organic active material that passes from the negative electrode chamber to the positive electrode chamber is "lost" to the energy storage system. The electrolyte is an alkaline mixture of potassium, sodium and lithium hydroxides with the exact composition being determined by the operational temperature range of the battery. Higher charge efficiencies at higher operational temperatures are favored by increased amounts of sodium hydroxide relative to potassium hydroxide. The electrolyte in the positive electrode compartment contains alkaline potassium hydroxide (greater than 1M) with 1-2% lithium hydroxide. This electrolyte is all contained within the positive electrolyte chamber. The negative electrolyte is a similar composition to the positive electrolyte but with the addition of approximately 0.5M of dipotassium 2, 6 dihydroanthraquinone. This electrolyte is contained within the negative electrode compartment and an external tank that is connected to the electrode chamber by two polypropylene tubes that allow the circulation of the electrolyte through the negative electrode chamber through the action of a peristaltic pump.

According to Antelman the redox potential of the nickel hydroxide active material vs. the standard hydrogen electrode is +0.49V. The redox potential of 2, 6 dihydroanthraquinone is determined by Lin et al. as approximately −0.68V. The open circuit voltage of this particular combined system is therefore 1.17V. Using anthraquinones with additional electron donating groups can significantly increase the open circuit voltage by depressing the redox potential of the negative electrode.

A significant advantage of using nickel oxide as the positive electrode is the lack of sensitivity of the open circuit voltage to the state of charge of the electrode. FIG. 2 shows a potential variation of 35 mV vs a zinc reference electrode, as the state of charge of the nickel electrode is changed from 20% to 80%. This compares to the 100 mV change for a flow system using 2 different redox couples at the positive and negative electrodes as shown by Lin et al.

The sizing of the reservoir of alkaline anthraquinone is determined by the Ampere hour capacity of the nickel hydroxide electrode such that there is at least a 20% coulombic excess Ampere hour capacity associated with the organic electroactive material. This assumes two electrons transferred in the electrochemical reaction for each organic molecule.

During the first formation charge, the 2, 6 dihydroanthraquinone is converted to the reduced form and the nickel hydroxide is converted to the oxidized NiOOH material. Charge Is passed until the nickel hydroxide is fully charged. This will require approximately 20% overcharge with the associated evolution of oxygen which will escape through a low pressure vent inserted into the electrolyte fill hole at the top of the positive electrode compartment. The first discharge will completely discharge the positive electrode and future charging will be carried out to 80% of the positive electrode available capacity. The end point will be determined by the redox potential of the oxidized and reduced material in the negative electrode reservoir. Cycling will then be carried out between 0-80% state of charge on the positive electrode. The 80% state of charge value has been chosen to maintain high coulombic charge efficiency by avoiding the oxygen evolution reaction that occurs at higher states of charge on the nickel oxide electrode. Similarly, it is important to avoid the evolution of hydrogen at the negative electrode by the suitable choice of organic reactants and the solid electrode substrate material. The latter must be free of material that can evolve hydrogen with low overvoltage such as iron, cobalt or nickel. The organic reactant should have reversible kinetics on the substrate and not exhibit a redox potential so negative as to evolve hydrogen during charge or during open circuit stand.

Alternative Positive Electrode Configuration

The nickel electrode used in example 1 is formed by impregnating a nickel foam substrate with nickel hydroxide active material in the form of an aqueous paste. The electrode is dried and compressed prior to use in the electrochemical cell. During use, the electrode undergoes some expansion particularly during overcharge. This can result in a loss or degradation of capacity. Physical constraints can be applied to reduce this expansion but this can result in a loss of volumetric energy density. The avoidance of overcharge described in example 1 can significantly moderate the problem. However, the use of more expensive but more dimensionally stable sintered plate nickel hydroxide electrodes can significantly improve the capacity stability. These electrodes are commonly used in aircraft starter nickel-cadmium batteries and are produced by electrochemically or chemically impregnating a powdered porous nickel plaque with nickel hydroxide.

Multiple Cell Battery

In order to supply higher voltages normally required by devices or loads, the single cell must be arranged electrically in series to provide multiples of the single cell voltage. This can be achieved using single cells connected by external bussing. However, it is more efficient to connect the cells in a bipolar arrangement where the electrical connection between adjacent positive and negative electrodes is achieved through a common electronically conducting "cell" wall as shown in FIG. 3. A single reservoir of negative active material can supply several unit cells in a parallel electrolyte feed arrangement. However, parasitic shunt currents between unit cells through the common electrolyte pathway must be minimized by employing longer and more electrically resistive pathways between the tank and various cells in the stack. The greater the number of cells within one module exacerbates this situation so depending on the operational conditions it is necessary to limit the number of unit cells in series being serviced by a single reservoir. This provides for a modularized approach that allows high voltage stacks with multiple tanks and pumps to be set up in series electrical arrangement. By avoiding the use of two flowing electrolytes within this hybrid system the problem is somewhat diminished and electrical leakage problems are minimized.

What is claimed is:

1. A single cell of a hybrid redox flow battery comprising:
    a solid nickel hydroxide positive electrode housed in a positive compartment filled with a non-circulated aqueous alkaline electrolyte;
    and a substituted anthraquinone based negative active material dissolved in a circulated alkaline electrolyte that is pumped from an external storage tank into a negative electrode compartment of the cell where an oxidation/reduction reaction occurs at a facilitating electrode;
    and a physical arrangement whereby the positive and negative electrode compartments are separated by an electronically insulating but ionically conductive membrane.

2. The single cell of a hybrid redox flow battery of claim 1 where the compartments are separated by a cation exchange membrane.

3. The single cell of a hybrid redox flow battery of claim 1 where an open circuit voltage at 50% state of charge is greater than 1.1V.

4. The single cell of a hybrid redox flow battery of claim 1 where the solid nickel hydroxide electrode is made from sintered nickel powder and impregnated with nickel hydroxide active material.

5. The single cell of a hybrid redox flow battery of claim 1 where the solid nickel hydroxide electrode is formed by impregnating nickel hydroxide into the pores of a highly porous nickel foam substrate.

6. The single cell of a hybrid redox flow battery of claim 1 where the compartments are separated by an anion exchange membrane.

7. The single cell of a hybrid redox flow battery of claim 1 where the solid nickel hydroxide positive electrode operates over a state of charge range less than 100% such that oxygen evolution is minimized.

8. The single cell of a hybrid redox flow battery of claim 1 configured in a bipolar arrangement in order to provide higher voltages.

9. The battery configured in the bipolar arrangement of claim 8 where more than 2 individual cells are simultaneously supplied negative electrolyte from a common tank.

10. The single cell of a hybrid redox flow battery of claim 1 where the end of charge point is determined by the redox potential of the oxidized and reduced material in the negative electrode reservoir.

11. The single cell of a hybrid redox flow battery of claim 1 where the continual state of charge can be monitored at a tank containing the redox flow materials by a simple electrochemical reference electrode system.

12. The hybrid flow battery of claim 1 where charge and discharge control are determined by spectroscopic means.

* * * * *